United States Patent [19]

Tatsumi et al.

[11] 4,099,638
[45] Jul. 11, 1978

[54] COATED GLASS BOTTLES

[75] Inventors: Tetsujiro Tatsumi; Reiji Miyamoto; Shiro Narasaki, all of Ichihara; Seiji Kazama, Kawanishi; Michio Tanaka, Takatsuki, all of Japan

[73] Assignees: Mitsui Polychemicals, Co., Ltd., Tokyo; Takeda Chemical Industries, Ltd., Osaka, both of Japan

[21] Appl. No.: 775,642

[22] Filed: Mar. 7, 1977

[30] Foreign Application Priority Data

Mar. 9, 1976 [JP] Japan .................................. 51-25971

[51] Int. Cl.² ...................... B65D 11/16; B32B 27/40
[52] U.S. Cl. .................................... 215/12 R; 428/35; 428/423
[58] Field of Search .............. 428/35, 423; 215/12 R, 215/DIG. 6

[56] References Cited

U.S. PATENT DOCUMENTS

| 3,889,031 | 6/1975 | Tatsumi et al. ................. 428/35 |
| 3,926,875 | 11/1975 | Tsugukuni et al. ........... 260/77.5 TB |

*Primary Examiner*—William R. Dixon, Jr.
*Attorney, Agent, or Firm*—Wenderoth, Lind & Ponack

[57] ABSTRACT

Glass bottles, suitable as containers for drinks, such as beer and fruit juice, are coated with a single layer of a thermally cured material formed of a powdery composition comprising a mixture of (i) a blocked organic polyisocyanate and (ii) a hydrolyzed ethylene-vinyl ester copolymer and/or a carboxyl-modified version of said hydrolyzed copolymer. The coated bottles are highly effective in the prevention of scattering of glass fragments in the event of breakage and excellent in clarity, alkali resistance, abrasion resistance, scratch resistance and weathering quality.

15 Claims, No Drawings

COATED GLASS BOTTLES

This invention relates to resin-coated glass bottles, the coatings of which have been produced by the powder-coating technique. More particularly, the invention is directed to glass bottles having a single-layer coating, highly effective in the prevention of scattering of glass fragments in the event of breakage and excellent in clarity, alkali resistance, abrasion resistance and weathering quality. Glass bottles have long been used in various fields, for example, as containers for beer, wine, whiskey, champagne, cola drinks, fruit juice, other soft drinks, etc., by virtue of their properties of high clarity, high resistance to chemicals, and no gas-permeability, etc. However, one fatal defect of glass bottles is low impact strength, and thus glass bottles are easily broken, and once broken, pieces of glass are scattered. Particularly, when glass bottles contain aerated drinks such as beer, coke, etc. are broken, the scattering of glass pieces is rather explosive.

For the purpose of eliminating or reducing this defect, it has been proposed that the surface of glass bottles is coated with some kinds of synthetic resins such as a partially ionized ethylene-$\alpha,\beta$-ethylenically unsaturated carboxylic acid copolymer or a hydrolyzed ethylene-vinyl acetate copolymer, etc. However, in the glass bottles coated with such resins as mentioned just above, such characteristics are apt to be lost that are proper to "glass" itself, such as clarity, resistance to chemicals, particularly alkaline substances, etc. More particularly stating, the partially ionized ethylene-$\alpha,\beta$-ethylenically unsaturated carboxylic acid copolymer is unsuitable for returnable containers because of its vulnerability to warm alkaline water in a bottle washing process, inadequate weathering quality and other drawbacks. The hydrolyzed ethylene-vinyl acetate copolymer is also unsuited for returnable bottles because it acquires opacity under the influence of warm alkaline washing water and is highly susceptible to injury in the filling stage and during transit and shipment. Under the circumstances the present inventors studied (1) the method which comprises coating a thermoplastic polyurethane solution onto a primer coat of a hydrolyzed ethylene-vinyl acetate copolymer or of a carboxy-modified version thereof; (2) the method which comprises coating a polyisocyanate solution alone or a mixture solution of a polyisocyanate with a thermoplastic polyurethane or a polyol onto an undercoat of said hydrolyzed copolymer or carboxyl-modified version to toughen the surface of the undercoat, and (3) the method which comprises coating a blocked organic polyisocyanate solution or a mixture solution of a blocked organic polyisocyanate and a polyol onto a coat of said hydrolyzed polymer or carboxyl-modified version and heating the coating so applied.

However, these methods invariably involve two successive coats, and the apparatus for the manufacture of coated bottles requires an ancillary device for surface hardening treatment, thus making the production setup costly and bulky. Moreover, as experience tells us, additional complexity is of necessity introduced to plant management and materials control, resulting in reduced product yields. In addition, such a surface hardening treatment requires the use of a solvent which not only detracts from the safety of operation with the risk of a fire but also adds to the problem of atmospheric pollution.

The present inventors undertook intensive studies on the disadvantages of the glass bottles coated with a hydrolyzed ethylene-vinyl acetate copolymer or a carboxyl-modified version thereof and the problems involved in the conventional surface hardening procedures in order to overcome the aforementioned disadvantages. The studies led to a successful solution to the problem of manufacturing resin-coated glass bottles without resort to any surface hardening treatment or a double-layer coating process, said bottles being such that it withstands returnable use and are substantially free from the scattering of fragments in the event of breakage. Thus, this invention relates to glass bottles having a single-layer coating on the surface thereof coated with a thermally cured material formed of a powdery composition comprising a mixture of (i) a blocked organic polyisocyanate and (ii) a hydrolyzed ethylene-vinyl ester copolymer and/or a carboxyl-modified version of said hydrolyzed copolymer.

The blocked organic polyisocyanate as used herein may be readily obtainable by reacting an isocyanate compound with a blocking agent in a conventional manner (for example, by the method which comprises adding an equivalent, based on isocyanate groups, of the blocking agent dropwise to the isocyanate compound or by the method which comprises adding an excess of the blocking agent to the isocyanate compound and removing the residual blocking agent from the reaction mixture by distillation or extraction). The reaction is carried out in the presence or absence of a solvent having no active hydrogen atom, such as ketones (e.g. acetone, methyl ethyl ketone, methyl isobutyl ketone, cyclohexanone), esters (e.g. methyl acetate, ethyl acetate, butyl acetate, ethoxyethyl acetate) or aromatic hydrocarbons (e.g. benzene, toluene, xylene) at room temperature or about 40° to 120° C. The blocked organic polyisocyanate (i) is such that, when heated, it liberates the blocking agent through thermal decomposition to regenerate the isocyanate groups. Said blocked organic polyisocyanate may be solid or liquid. As examples of said isocyanate compound may be mentioned aromatic, aralkyl, aliphatic and alicyclic diisocyanates such as ethylene diisocyanate, propylene diisocyanate, tetramethylene diisocyanate, hexamethylene diisocyanate, decamethylene diisocyanate, phenylene diisocyanate, tolylene diisocyanate, naphthylene diisocyanate, 4,4'-methylenebis(phenylisocyanate), 4,4'-ethylene-bis(phenylisocyanate), $\omega,\omega'$-diisocyanato-1,3-dimethylbenzene, $\omega,\omega'$-diisocyanato-1,4-dimethylbenzene, 1-methyl-2,4-diisocyanatocyclohexane, $\omega,\omega'$-diisocyanatodiethylbenzene, $\omega,\omega'$-diisocyanatodimethyltoluene, $\omega,\omega'$-diisocyanatodiethyltoluene, $\omega,\omega'$-diisocyanatodimethylxylene, $\omega,\omega'$-diisocyanatodiethylxylene, 4,4'-methylene-bis (cyclohexylisocyanate), 4,4'-ethylene-bis(cyclohexylisocyanate), $\omega,\omega'$-diisocyanato-1,3-dimethylcyclohexane, $\omega,\omega'$-diisocyanato-1,4-dimethylcyclohexane, isophorone diisocyanate, lysine diisocyanate; triisocyanates such as triphenylmethane triisocyanate, etc. as well as the compounds obtainable by reacting an excess of any of such diisocyanates with one of low molecular polyols with molecular weights in the range of 60 to 2000 such as ethylene glycol, propylene glycol, 1,3-butylene glycol, neopentyl glycol, 2,2,4-trimethyl-1,3-pentanediol, hexamethylene glycol, cyclohexanedimethanol, trimethylolpropane, 1,2,6-hexanetriol, glycerin, sorbitol, sorbit, sucrose, pentaerythritol, etc. Among such isocyanate compounds, diisocyanates are preferred from the view-point of the clarity of the coatings. More preferable ones are tolylene diisocyanate, ethylene diisocyanate, tetramethylene diisocyanate, hexamethylene diisocyanate, 4,4'-methylene-bis(cyclohexylisocyanate), 4,4'-ethylene-bis(cyclohexylisocyanate), ω,ω'-diisocyanato-1,3-dimethylbenzene, ω,ω'-diisocyanato-1,4-dimethylbenzene, ω,ω'-diisocyanato-1,4-dimethylcyclohexane, ω,ω'-diisocyanato-1,3-dimethylcyclohexane, etc. The most preferable ones are 4,4'-methylene-bis(cyclohexylisocyanate), ω,ω'-diisocyanato-1,3-dimethylbenzene, ω,ω'-diisocyanato-1,4-dimethylbenzene. These isocyanates may be employed alone or as a mixture of two or more.

The blocking agent may be any of the blocking agent hitherto known to be of use in the blocking of isocyanates, such as those of the phenol, lactam, active methylene, alcohol, mercaptan, acid amide, imide, amine, imidazole, urea, imine, oxime or sulfite type. More preferable ones are blocking agents of the phenol, oxime, lactam or active methylene type. The most preferable one is ε-caprolactam from the view-point of the clarity of the coating. As specific examples of such blocking agent may be mentioned the following.

Blocking agents of the phenol type:
Phenol, cresol, xylenol, nitrophenol, chlorophenol, ethylphenol, p-hydroxydiphenyl, t-butylphenol, hydroxybenzoic acid, hydroxybenzoate esters, 2,5-di-t-butyl-4-hydroxytoluene, etc.

Blocking agents of the lactam type:
ε-Caprolactam, δ-valerolactam, γ-butyrolactam, β-propiolactam, etc.

Blocking agents of the active methylene type:
Diethyl malonate, Dimethyl malonate, Ethyl acetoacetate, methyl acetoacetate, acetylacetone, etc.

Blocking agents of the alcohol type:
Methanol, ethanol, n-propyl alcohol, isopropyl alcohol, n-butyl alcohol, isobutyl alcohol, t-butyl alcohol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, benzyl alcohol, methoxy methanol, glycolic acid and glycolic acid esters such as methyl glycolate, ethyl glycolate, butyl glycolate, etc., lactic acid and lactic acid esters, methyl lactate, ethyl lactate, butyl lactate, etc., methylolurea, methylolmelamine, diacetone alcohol, ethylenechlorohydrin, ethylenebromohydrin, 1,3-dichloro-2-propanol, ω-hydroperfluoroalcohol, acetocyanohydrin, etc.

Blocking agents of the mercaptan type:
Butylmercaptan, hexylmercaptan, t-butylmercaptan, t-dodecylmercaptan, 2-mercaptobenzothiazole, thiophenol, methylthiophenol, ethylthiophenol, etc.

Blocking agents of the acid amide type:
Acetoanilide, acetoanisidide, acetotoluide, acrylamide, methacrylamide, acetamide, stearylamide, benzamide, etc.

Blocking agents of the imide type:
Succinimide, phthalimide, maleinimide, etc.

Blocking agents of the amine type:
Diphenylamine, N-phenylnaphthylamine, xylidine, N-phenylxylidine, carbazole, aniline, naphthylamine, butylamine, dibutylamine, butylphenylamine, etc.

Blocking agents of the imidazole type:
Imidazole, 2-ethylimidazole, etc.

Blocking agents of the urea type:
Urea, thiourea, ethyleneurea, ethylenethiourea, 1,3-diphenylurea, etc.

Blocking agents of the carbamic acid ester type:
N-phenylcarbamic phenyl ester, 2-oxazolidone, etc.

Blocking agents of the imine type:
Ethyleneimine, etc.

Blocking agents of the oxime type:
Formaldoxime, acetaldoxime, acetoxime, methyl ethyl ketoxime, diacetylmonooxime, benzophenoneoxime, cyclohexanoneoxime, etc.

Blocking agents of the sulfite type:
Sodium bisulfite, potassium bisulfite, etc.

The hydrolyzed ethylene-vinyl ester copolymer employed according to this invention may be prepared, for example, by copolymerizing ethylene and vinyl ester monomer in a conventional manner (e.g. U.S. Pat. Nos. 2,200,429 & 2,703,794) and, then, hydrolyzing the resultant copolymer in a known manner (e.g. U.S. Pat. No. 2,386,347).

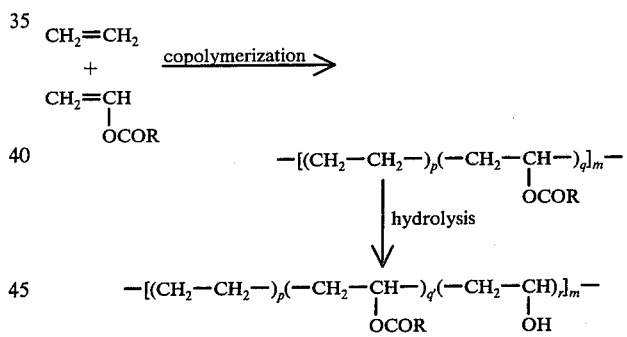

(wherein R is a lower alkyl of 1 to 6 carbon atoms)

As examples of said vinyl ester monomer, there may be mentioned vinyl acetate, vinyl propionate, vinyl butyrate and vinyl benzoate, etc. In the above, the content of ethylene units ($p/(p+q) \times 100$) is preferably more than 50 mole percent. In case the ethylene content is less, the melt viscosity of the system is reduced sometimes to the extent that coats with a satisfactory appearance cannot be obtained. The content of vinyl alcohol units ($=r/(p+q) \times 100$, $q'+r=q$) is preferably more than 5 mole percent. If the vinyl alcohol content is too low, the effect of cross-linking or cure by the blocked organic polyisocyanate will be insufficient so that, sometimes, the high abrasion resistance of the coating, which is one of the objectives of this invention, will not be realized. As a particularly desirable composition may be mentioned a composition consisting of 70 to 95 mole percent of ethylene ($p/(p+q) \times 100$), 0 to 25 mole percent of vinyl ester ($q'/(p+q) \times 100$) and 5 to 25 mole percent of vinyl alcohol ($r/(p+q) \times 100$), for instance.

The melt index of this hydrolyzed copolymer is preferably in the range of 1 to 1000, particularly from 10 to 500.

In this invention, a carboxyl-modified version of said hydrolyzed copolymer may likewise be employed. This is more desirable because it is even superior to the mere hydrolyzed copolymer in the freedom from opacity in the bottle washing process and in watertight bonding quality. As described hereinafter, this carboxyl-modified version can be produced, for example by reacting said hydrolyzed copolymer with a carboxyl-containing unsaturated compound or a cyclic acid anhydride.

(1) When a carboxyl-containing unsaturated compound is reacted, the reaction is conducted normally by adding a radical forming reagent to the reaction system and heating it in the presence or absence of an appropriate solvent (such as aliphatic hydrocarbons, e.g. hexane and heptane; alicyclic hydrocarbons, e.g. cyclohexane; aromatic hydrocarbons, e.g. benzene, toluene and xylene; halogenated hydrocarbons, e.g. trichloroethylene, tetrachloroethylene and chlorobenzene; butanol, methyl ethyl ketone, methyl isobutyl ketone, dioxane, cyclohexanone, etc.). The term "carboxyl-containing unsaturated compound" as used herein means any of the compounds represented by the general formula $CHR^1=CR^2COOH$ and wherein $R^1$ and $R^2$ are hydrogen, alkyl, carboxyl or carboxylic acid ester. Thus, there may be mentioned such compounds as acrylic acid, methacrylic acid, crotonic acid, itaconic acid and the like. The proportion of such compound based on the hydrolyzed ethylene-vinyl ester copolymer is about 2 weight percent at most and, preferably, within the range of about 0.05 to 0.5 weight percent. The term "radical-forming agent" as used herein means a substance which is easily decomposed at the graft-polymerization temperature to yield a radical. Thus, for example, organic peroxides such as benzoyl peroxide, lauroyl peroxide, dicumyl peroxide, etc. and certain nitrogen-containing compounds, e.g. $\alpha,\alpha'$-azobisisobutyronitrile, may be mentioned. Such radical-forming agent is employed in a proportion of about 0.05 to 3 weight percent and, preferably, from about 0.1 to 1 weight percent based on the hydrolyzed ethylene-vinyl ester copolymer. Referring to the above reaction, although the heating temperature cannot be specified in general terms, it depends upon such factors as the types of carboxyl-containing unsaturated compound and solvent. Generally, it may be somewhere between about 50° and about 150° C. The duration of heating may range from about 0.1 to 5 hours. The product obtainable by the above reaction will be referred to briefly as a graft-modified version.

(2) In reacting a hydrolyzed ethylene-vinyl ester copolymer with a cyclic acid anhydride, the reaction is normally carried out by heating the reactants at about 50° to 150° C for about 0.1 to 5 hours, in the presence or absence of a suitable solvent. The term "cyclic acid anhydride" as used herein means a compound of the general formula:

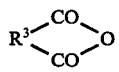

where $R^3$ may for example be a bivalent aromatic or aliphatic residue. As specific examples of said cyclic acid anhydride may be mentioned maleic anhydride, succinic anhydride, glutaric anhydride, phthalic anhydride, itaconic anhydride, trimellitic anhydride and 3,6-endomethylenetetrahydrophthalic anhydride (hymic anhydride), etc. It is presumed that the cyclic acid anhydride will have been fissioned by the OH—groups contained in the hydrolyzed copolymer as a result of the above reaction to yield

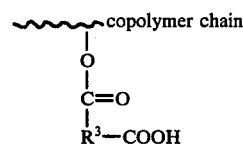

The amount of said cyclic acid anhydride should be sufficient to react with (esterify) about 5 mole percent at most, preferably about 0.2 to 2 mole percent, of the vinyl alcohol units contained in said hydrolyzed copolymer.

The powdery resin composition employed in accordance with this invention is prepared by admixing the aforementioned hydrolyzed ethylene-vinyl ester copolymer and/or a carboxyl-modified version of said hydrolyzed copolymer with the aforesaid blocked organic polyisocyanate. The admixing may be performed by any of the following procedures. Thus, said hydrolyzed copolymer and/or carboxyl-modified version thereof and said blocked organic polyisocyanate are dissolved in an appropriate solvent (e.g. toluene or xylene) and the solution is caused to precipitate as a powder by the addition of a poor solvent (e.g. n-hexane, petroleum benzine, cyclohexane, n-heptane, n-octane). Alternatively, a powdery preparation of said hydrolyzed copolymer and/or carboxyl-modified version is slurried with a solution of said blocked organic polyisocyanate in a suitable solvent (e.g. ethyl acetate or butyl acetate) and the solvent is then removed by evaporation. Alternatively, the two components as they are solid may be fused together. This melt-blending procedure is preferably carried out within the temperature range where the blocking agent contained in the polyisocyanate component will not be decomposed. Depending upon the type of blocking agent, the melt-blending temperature may range from about 80° to 140° C and, preferably, from about 90° to 110° C. This melt-blending may be accomplished by means of such mechanical aids as a mixer, kneader, hot-roll mill, extruder, Banbury mixer, etc. After the two components are melt-blended, the mixture is cooled, crushed to an appropriate particle size and sorted through a sieve. The compounding ratio of one of the components to the other component is such that the blocked polyisocyanate compound is employed in a proportion of about 0.01 to 1 mole equivalent, preferably about 0.1 to 0.5 equivalent, to each mole of the hydroxyl groups available in the hydrolyzed ethylene-vinyl ester copolymer and/or carboxy-modified version thereof. In this operation, a known catalyst effective in the liberation of the blocking agent in the polyisocyanate component (e.g. tin compounds such as stannous diacetate, stannous di(2-ethylhexanoate), stannic tetraacetate, stannous tetra(2-ethylhexoate), dibutyltin dilaurate, tetrabutyl 1,3-diformoxydistannoxane, tetrabutyl 1,3-diacetoxydistannoxane, etc.) in a proportion of about 0.1 to 5 weight percent based on the polyisocyanate component may be added.

The specific procedures employable for the coating of a glass bottle with a powdery resin composition according to this invention include such conventional powder coating technique as fluidized-bed process and electrostatic process.

In the fluidized-bed process, generally the glass bottle is preheated and, then, coated with the powder, while in the electrostatic process, it is optional to preheat the glass bottle. Hereafter, the deposited powdery coating undergoes levelling and cross-linking (curing) by post-heating. The post-heating is effected to a temperature (e.g. 100° to 250° C) not lower than the point at which the organic polyisocyanate will be sufficiently decomposed. The duration of heating may range from about 1 minute to about 60 minutes. Where the melt-viscosity of the powder coating is relatively high, however, there may be cases in which the cross-linking reaction proceeds even before adequate levelling takes place, thus failing to provide a satisfactory finish (appearance). In such cases, it is an advisable procedure to heat the bottle to a temperature which is beyond the melting point of the powdery coating composition but below the decomposition point of the blocked organic polyisocyanate in the first place so as to cause levelling of the coating and, then, heat the same further to a temperature in excess of the decomposition point of the blocked organic polyisocyanate to let the film cross-link and cure. Where a still firmer bond strength between the glass bottle and resin is desired, it is practicable to prime the surface of the glass bottle with a silane coupling solution before the powder coating is applied.

Thickness of the coating is about 5 to about 300 microns, more preferably about 50 to about 200 microns.

The resin-coated glass bottles thus obtainable according to this invention not only provide excellent abrasion- and scratch-resistances but also gives good clarity, alkali-resistance and weathering quality. These qualities plus its virtual freedom from the scattering of glass fragments upon breakage make the present product particularly suited for use as a returnable container, such as the containers for aerated beverages. Of course, such characteristics as those mentioned cannot be accomplished by the mere application of a hydrolyzed ethylene-vinyl ester copolymer.

The following examples are further illustrative of the invention. The test data given in the examples were obtained by the following test procedures.

(1) Alkali resistance

The resin-coated glass bottles were immersed in a 4 weight percent aqueous solution of sodium hydroxide at 70° C for 3 hours, taken out from the solution and examined for apparent defects.

(2) Abrasion resistance test

The resin-coated glass bottles were immersed in a 4 weight percent aqueous solution of sodium hydroxide at 70° C for 3 hours and tested in the following manner by an AGR Line Simulator (American Glass Research, Inc.). The bottles were examined for the degree of surface injury.

The Line Simulator consisted of a circular aluminum drive disc covered with a non-metallic cover disc on which the bottles were carried. These discs were 24 inches in diameter and were driven by the motor at an equivalent linear speed of approximately 840 bottles per minute.

The bottles were guided in a circular path by two pairs of plastic rails which constituted a channel approximately 10% wider than the diameter of the bottles. The inner pair of rails were mounted in brackets on a removable center plate which could be readily interchanged with similar plates of various diameters to accommodate bottle sizes over a wide range. A hand wheel was used to clamp the center plate on the drive shaft. A rubber covered gate activated by an adjustable spring interrupted the flow of bottles through the channel, creating line pressure and resulting in approximately 20% slippage of the bottles on the cover disc. The equivalent linear speed of the bottles was thus about 672 bottles per minute. The bottles rolled and ground through the gate and received an impact as they "catched-up" to the line after passing through. At a point just ahead of the gate, water from an adjustable spray head was automatically turned on by an electric valve during entire abuse treatment. The entire assembly was mounted in a circular stainless steel enclosure. The duration of abuse was set forth 60 minutes.

(3) Weathering quality

The resin-coated glass bottles were irradiated with a sunshine-type weather-o-meter for 2,000 hours and examined for possible surface changes.

(4) Scatter-prevention quality

The test bottles were filled with an aerated water ($CO_2$ gas volume: 3.6) to a predetermined level and stoppered. The bottles were immersed in a constant-temperature water bath at 25° C for 30 minutes or longer and caused to drop in a horizontal position from a height of 75 cm onto a concrete floor with a flat, smooth surface and a thickness of at least 20 cm. The resin-coated bottles were judged to have passed the test when 95 weight percent or more of the resultant glass fragments were located within a radius of 1 meter about the impact point of drop.

EXAMPLE 1

(i) A copolymer of ethylene and vinyl acetate (ethylene content: 88.8 mole percent, molecular weight: about 10,000) is hydrolyzed by methanolic solution of sodium hydroxide to give a fine powdery (100 mesh pass) partially hydrolyzed copolymer (vinyl alcohol content of 8.9 mole percent: Melt Index: 85)

(ii) ε-Caprolactam-blocked 4,4'-methylene-bis(cyclohexylisocyanate) was obtained by reacting equivalent (based on isocyanate groups) of fused ε-caprolactam with 4,4'-methylenebis(cyclohexylisocyanate) in the presence of ethylacetate and di-butyltindilaurate (0.02 weight percent/non-volatile) at about 70° to 75° C for about 6 hours.

After the reaction, ethyl acetate in the reaction mixture was removed by means of a vacuum dryer to give a solid ε-caprolactam-blocked 4,4'-methylene-bis(cyclohexylisocyanate).

(iii) The powdery hydrolyzed ethylene-vinyl acetate copolymer with a melt index of 85, an ethylene content of 88.8 mole percent and a vinyl alcohol content of 8.9 mole percent was admixed with a solution of ε-caprolactamblocked 4,4'-methylene-bis(cyclohexylisocyanate) in ethyl acetate in an NCO/OH ratio of 0.4 to prepare a wet cake. Then, a large proportion of ethyl acetate in the wet cake was removed by means of a vacuum dryer and the residual ethyl acetate was further removed almost thoroughly using a fluidizedbed dryer.

(iv) By the electrostatic coating process, the resultant powdery product was deposited on the surface of the glass bottle (500 ml capacity) which was previously primed with an aqueous solution containing 2 weight percent of silane coupling agent, 0.02 weight percent of sodium dodecylbenzenesulfonate and 0.1 weight percent of acetic acid, following to be preheated to 130° C. Hereafter, the coating was levelled for 10 minutes at 150° C, following to be heatcured at 200° C for 10 minutes. By the above procedure was obtained a resin-coated bottle with a film thickness of 200 microns. As a control, a similar powdery hydrolyzed ethylene-vinyl acetate copolymer with a melt index of 85, an ethylene content of 88.8 mole percent and a vinyl alcohol content of 8.9 mole percent was employed alone to obtain a resin-coated bottle with a coating thickness of 200 microns in the same manner as above (control 1). The two resin-coated bottles were then tested for various performances by the procedures hereinbefore described. The results are set forth in Table 1.

Table 1

|  | Example (Test No. 1) | Control 1 (Test No. 2) |
|---|---|---|
| Appearance | Clear | Slightly opaque |
| Alkali resistance | Slight blushing, but returns to normal | Severe blushing |
| Abrasion resistance | Substantially not injured | Severely injured due to abrasion between bottles and by guide-line |
| Weathering quality | No change in resin coating even after 2000 hrs'exposure to weather-o-meter | Resin coating cracked on 500 hrs' exposure to weather-o-meter |
| Scattering prevention | All of 10 bottles pass | 4 out of 10 bottles fail |

EXAMPLE 2

(i) In 1,000 weight parts of xylene was dissolved 100 weight parts of the hydrolyzed ethylene-vinyl acetate copolymer obtained in Example 1. To the solution were added 2 weight parts of acrylic acid and 0.2 weight part of benzoyl peroxide. The mixture was heated to 100° C and reacted for 3 hours. After the reaction, the reaction mixture was poured into methanol. The resultant precipitates were filtered off, washed with methanol and dried. The copolymer was grafted by 0.3 weight percent of acrylic acid and the melt index was 75.

(ii) By means of an extruder, a graft-modified copolymer was melted at 120° C together with ε-caprolactam-blocked 4,4'-methylene-bis(cyclohexylisocyanate) obtained in Example 1 in a varying NCO/OH ratio as set forth in Table 2. The resultant melt-blend was mechanically crushed to prepare a powder with an average particle diameter of 83 microns.

Using the powdery coating materials thus prepared, resin-coated bottles with a coating thickness of 200 microns were produced by exactly the same procedure as that described in Example 1.

Table 2

| Test No. | 2 | 3 | 4 | 5 | 6 | 7 |
|---|---|---|---|---|---|---|
| NCO/OH (mole) ratio | 0 | 0.2 | 0.4 | 0.6 | 0.8 | 1.0 |
| Test |  |  |  |  |  |  |
| Appearance | Slight blushing | Clear | Clear | Clear | Clear | Clear |
| Alkali resistance | Severe blushing | No blushing | No blushing | No blushing | No blushing | No blushing |
| Abrasion resist- | Severely injured | Slightly injured | Almost not injured | Not injured at all | Not injured at all | Not injured at all |

Table 2-continued

| Test No. | 2 | 3 | 4 | 5 | 6 | 7 |
|---|---|---|---|---|---|---|
| NCO/OH (mole) ratio | 0 | 0.2 | 0.4 | 0.6 | 0.8 | 1.0 |
| Test |  |  |  |  |  |  |
| ance |  |  |  |  |  |  |
| Weathering quality | Cracked by the end of 500 hrs. | No change after 2000 hrs. | No change after 2000 hrs. | No change after 2000 hrs. | No change after 2000 hrs. | No change after 2000 hrs. |
| Scattering prevention | 4/10 | 9/10 | 10/10 | 10/10 | 9/10 | 7/10 |

EXAMPLE 3

By a procedure similar to that described in Example 1, a graft-modified polymer (Melt Index 75) prepared by grafting 0.3 weight percent of acrylic acid to a hydrolyzed ethylenevinyl acetate copolymer with an ethylene content of 88.8 mole percent and a vinyl alcohol content of 8.9 mole percent was admixed with one of the various blocked organic polyisocyanates in an NCO/OH mole ratio of 0.4 as in Example 1. Then, the procedure of Example 1 was repeated except that the conditions of levelling and curing were modified as shown in Table 3. The tests performed on the resultant resin-coated bottles showed that they were all satisfactory in appearance, alkali resistance, abrasion resistance, weathering quality and scatter prevention.

Table 3

| Test No. | Type of blocked organic polyisocyanate | Conditions of levelling Temp. × time | Conditions of curing Temp. × time |
|---|---|---|---|
| 8 | ε-caprolactam-blocked ω,ω'-diisocyanatodimethylcyclohexane | 130° C × 10 min. | 200° C × 10 min. |
| 9 | Methyl ethyl ketoxime-blocked ω,ω'-diisocyanatodimethylbenzene | 130° C × 20 min. | 200° C × 10 min. |
| 10 | Diacetyl monooxime-blocked ω, ω'-diisocyanatodimethylbenzene | 125° C × 30 min. | 180° C × 10 min. |
| 11 | Cyclohexanoneoxime-blocked 4, 4'-methylene-bis (cyclohexylisocyanate) | 150° C × 10 min. | 200° C × 10 min. |
| 12 | Ethyl lactate-blocked tolylene diisocyanate | 150° C × 10 min. | 200° C × 10 min. |
| 13 | Benzyl alcohol-blocked hexamethylene diisocyanate | 150° C × 10 min. | 220° C × 10 min. |

In Table 3, the blocked organic polyisocyanates were obtained by reacting diisocyanates with blocking agents in similar manners to that of Example 1.

EXAMPLE 4

(i) ε-Caprolactam-blocked ω,ω'-diisocyanatodimethylbenzene was obtained by reacting, ω,ω'-diisocyanatodimethylbenzene with ε-caprolactam in the similar manner to that of Example 1.

(ii) By means of a small extruder and at 120° C, a graft-modified version of hydrolyzed ethylene vinyl acetate copolymer having the composition set forth in Table 4 was melted and admixed with ε-caprolactam-blocked ω,ω'-diisocyanatodimethylbenzene in a varying NCO/OH mole ratio as set forth in Table 4. Each mixture was mechanically crushed to prepare a powdery composition with an average particle diameter of about 90 microns.

The powdery compositions thus obtained were used to coat glass bottles in exactly the same manner as Example 1, whereby resin-coated bottles with a coating thickness of 200 microns were obtained. The conditions of curing, however, were modified as shown in Table 4. The results of performance tests on these resin-coated glass bottles are set forth in Table 4.

Table 4

| Test No. | | 14 | 15 | 16 | 17 |
|---|---|---|---|---|---|
| Composition of powdery coating | Melt Index | 68 | 84 | 105 | 46 |
| | Ethylene | 92.4 | 86.2 | 81.9 | 75.4 |
| | Vinyl alcohol | 5.6 | 11.3 | 15.2 | 20.5 |
| | Acrylic acid | 0.15 | 0.21 | 0.19 | 0.32 |
| | NCO/OH (mole ratio) | 0.71 | 0.35 | 0.26 | 0.20 |
| Conditions of curing | | 215° C × 20 min. | 215° C × 15 min. | 215° C × 10 min. | 215° C × 10 min. |
| Test | Appearance | Clear | Clear | Clear | Clear |
| | Alkali resistance | No blushing | No blushing | No blushing | No blushing |
| | Abrasion resistance | Slightly injured | Almost not injured | Not injured at all | Not injured at all |
| | Weathering quality | No change after 2000 hrs. | No change after 2000 hrs. | No change after 2000 hrs. | No change after 2000 hrs. |
| | Scatter resistance | 8/10 | 10/10 | 9/10 | 8/10 |

In Table 4, the hydrolyzed ethylene-vinyl acetate copolymers were obtained in similar manners to that of Example 1 and the graft-modified copolymers were obtained in similar manners to that of Example 2.

What is claimed is:

1. A glass bottle having a single-layer coating on the surface thereof coated with a thermally cured material formed of a powdery composition comprising a mixture of (i) a blocked organic polyisocyanate and (ii) a member selected from the group consisting of a hydrolyxed ethylene-vinyl ester copolymer, a carboxyl-modified version of the hydrolyzed copolymer or mixtures thereof, said ethylene-vinyl copolymer being selected from the group consisting of vinyl acetate, vinyl propionate, vinyl butyrate and vinyl benzoate copolymers.

2. A glass bottle as claimed in claim 1, wherein at least a portion of the component (ii) is a carboxyl-modified version of a hydrolyzed ethylene-vinyl ester copolymer.

3. A glass bottle as claimed in claim 2, wherein the carboxyl-modified version of a hydrolyzed ethylene-vinyl ester copolymer is a copolymer prepared by reacting a hydrolyzed ethylene-vinyl ester copolymer with a carboxyl-containing unsaturated compound.

4. A glass bottle as claimed in claim 2, wherein the carboxyl-modified version of a hydrolyzed ethylene-vinyl ester copolymer is a copolymer prepared by reacting a hydrolyzed ethylene-vinyl ester copolymer with a cyclic acid anhydride.

5. A glass bottle as claimed in claim 3, wherein the carboxyl-containing unsaturated compound is acrylic acid or methacrylic acid.

6. A glass bottle as claimed in claim 3, wherein the proportion of a carboxyl-containing unsaturated compound based on a hydrolyzed ethylene-vinyl ester copolymer is within the range of about 0.05 to 0.5 weight percent.

7. A glass bottle as claimed in claim 1, wherein the component (i) is a blocked organic polyisocyanate prepared by reacting a diisocyanate with a blocking agent.

8. A glass bottle as claimed in claim 7, wherein the diisocyanate is 4,4'-methylene-bis(cyclohexyl isocyanate) or $\omega,\omega'$-diisocyanato-dimethylbenzene.

9. A glass bottle as claimed in claim 7, wherein the blocking agent is $\epsilon$-caprolactam.

10. A glass bottle as claimed in claim 1, wherein the hydrolyzed ethylene-vinyl ester copolymer is a copolymer consisting of 70 to 95 mole percent of ethylene, 0 to 25 mole percent of vinyl ester and 5 to 25 mole percent of vinyl alcohol.

11. A glass bottle as claimed in claim 1, wherein the melt index of the hydrolyzed ethylene-vinyl ester copolymer is within the range of 1 to 1000.

12. A glass bottle as claimed in claim 1, wherein the compounding ratio of the component (i) to the component (ii) is within the range of about 0.01 to 1 mole equivalent to each mole of hydroxyl groups in the hydrolyzed ethylene-vinyl ester copolymer, the carboxyl-modified version or mixtures thereof.

13. A glass bottle as claimed in claim 1, wherein the coating layer has a thickness of about 5 to about 300 microns.

14. A glass bottle as claimed in claim 1, wherein the compounding ratio of the component (i) to the component (ii) is within the range of about 0.01 to 1 mole equivalent to each mole of hydroxyl groups in the hydrolyzed ethylene-vinyl ester copolymer or the carboxyl-modified version thereof or the mixture; the melt index of the hydrolyzed ethylene-vinyl ester copolymer is within the range of 1 to 1000 and the coating layer has a thickness of from 5 to 300 microns.

15. A glass bottle as claimed in claim 1, wherein the compounding ratio of the component (i) to the component (ii) is within the range of about 0.1 to 0.5 mole equivalent to each mole of hydroxyl groups in the hydrolyzed ethylene-vinyl ester copolymer or the carboxyl-modified version thereof or the mixture; the melt index of the hydrolyzed ethylene-vinyl ester copolymer is within the range of 10 to 500 and the coating layer has a thickness of from 50 to 200 microns.

* * * * *

UNITED STATES PATENT AND TRADEMARK OFFICE
CERTIFICATE OF CORRECTION

PATENT NO. : 4,099,638

DATED : July 11, 1978

INVENTOR(S) : Tetsujiro TATSUMI; Reiji MIYAMOTO; Shiro NARASAKI
Seiji KAZAMA; Michio TANAKA It is certified that error appears in the above-identified patent and that said Letters Patent are hereby corrected as shown below:

Col. 11, line 43, change "hydrolyxed" to -- hydrolyzed --.

Signed and Sealed this

Sixth Day of October 1981

[SEAL]

Attest:

GERALD J. MOSSINGHOFF

*Attesting Officer*  *Commissioner of Patents and Trademarks*